United States Patent [19]
Brown

[11] 3,807,750
[45] Apr. 30, 1974

[54] APPLIANCE DOLLY

[76] Inventor: Warren F. Brown, 1075 Florence Way, Campbell, Calif. 95008

[22] Filed: Oct. 19, 1972

[21] Appl. No.: 298,959

[52] U.S. Cl. ............................... 280/35, 280/79.1
[51] Int. Cl. .......................................... B62d 21/14
[58] Field of Search ........ 280/36 R, 34 R, 34 B, 35, 280/79.1, 79.2, 79.3; 214/390

[56] References Cited
UNITED STATES PATENTS

| | | | |
|---|---|---|---|
| 1,322,719 | 11/1919 | Nelson | 280/79.1 |
| 3,168,329 | 2/1965 | Goldschmidt | 280/36 R |
| 2,174,870 | 10/1939 | Daniels | 280/79.3 |
| 2,738,983 | 3/1956 | Essig | 280/34 B |

Primary Examiner—Robert R. Song

[57] ABSTRACT

A collapsible and adjustable dolly is provided for removing or installing heavy domestic appliances such as ovens, air-conditioners and the like from built-in cabinetry. The adjustable dolly includes a pair of tandem dolly wheel assemblies rigidly interconnected by a foot bar and pivotably supporting a pair of rear vertical support frames. A vertically adjustable front lifting bar pivotably interconnects the front vertical legs of each of the vertical side frame members for supportively engaging the front portion of the appliance. The side frame members are rearwardly pivoted toward the side of the appliance as it is wheeled out of the cabinet on the front tandem wheel support structure. A pair of vertically adjustable lugs, carried from the rear vertical legs of the vertical side frame members, engage the rear portion of the appliance for placing the four-wheel dolly under the appliance.

7 Claims, 3 Drawing Figures

PATENTED APR 30 1974 3,807,750

APPLIANCE DOLLY

BACKGROUND OF THE INVENTION

The present invention relates in general to a dolly for a serviceman or installer to handle built-in domestic appliances such as ovens, air-conditioners and the like.

Heretofore, built-in ovens were removed from their cabinetry for servicing by manually pulling the appliance out of the built-in cabinetry and then setting the appliance on a dolly or on a hand truck for servicing or replacement. The problem with this arrangement is that the front panel of the appliance generally includes a flange portion which is easily damaged unless special precautions are taken in handling of the heavy appliance. Also these appliances are becoming heavier, thereby increasing the risk of injury to the serviceman or installer having to manually handle such appliances.

Therefore a need exists for a simple appliance dolly particularly suitable for handling heavy domestic appliances to be installed within enclosing cabinetry.

SUMMARY OF THE PRESENT INVENTION

The principal object of the present invention is the provision of an improved appliance dolly.

In one feature of the present invention, the dolly includes a wheeled vertically adjustable front support structure for supportive engagement with the front region of the appliance and a wheeled rear support frame structure rearwardly pivotable into supportive engagement with the appliance as the appliance is withdrawn from its enclosure on the front-wheeled support structure.

In another feature of the present invention, the rearwardly pivotable support frame structure includes a pair of vertically adjustable lugs for engaging the rear portion of the appliance.

In another feature of the present invention, the wheels for the front support structure comprise two tandem wheel assemblies rigidly interconnected by a horizontal foot bar coupled to the wheel assemblies in between the tandem wheels thereof with said tandem wheel assemblies supporting the front load of the appliance on a pair of vertical support legs pivotably connected to the tandem wheel assemblies in between the tandem wheels thereof, whereby substantial stability is achieved in the appliance dolly.

In another feature of the present invention, the rear support lugs are pivotable on the rear vertical legs of the pivotable side frame structures to facilitate flat collapsing of the dolly for storage and transport.

In another feature of the present invention pivotable casters form the wheels of the pivotable rear support frame structures to facilitate pivoting of the rear support frames into engagement with the appliance and to facilitate steering of the appliance on the dolly after the appliance has been withdrawn from the cabinetry.

Other features and advantages of the present invention will become apparent upon a perusal of the following specification taken in connection with the accompanying drawings wherein:

DESCRIPTION OF THE PREFERRED EMBODIMENTS

Figure 1:
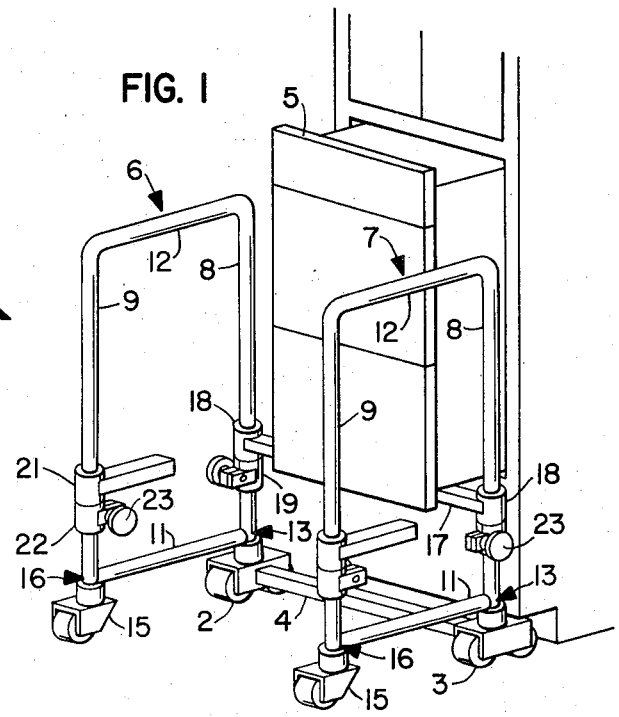
FIG. 1 is a perspective view of the appliance dolly as it is employed in the first step of removing an appliance from its enclosing cabinet.
Figure 2:
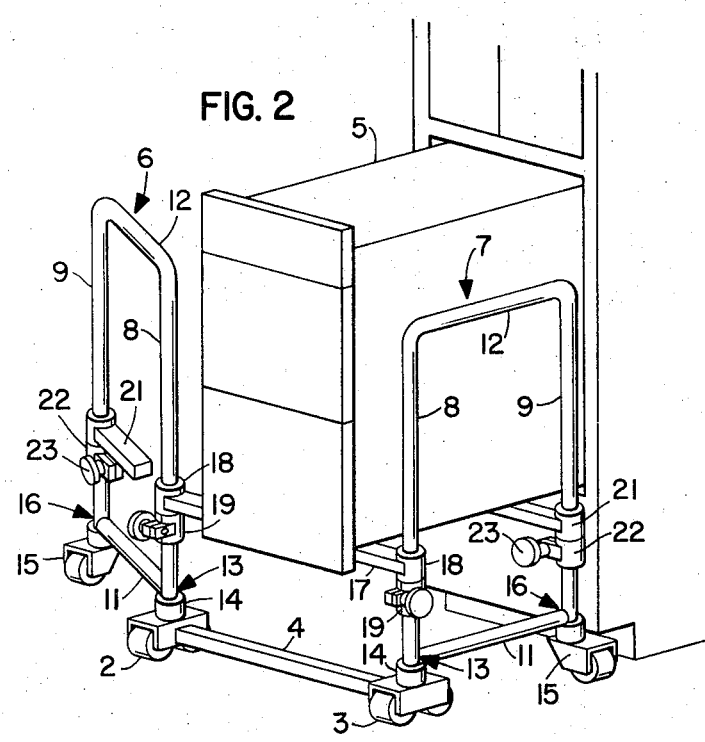
FIG. 2 is a perspective view similar to that of FIG. 1 depicting pivoting of the side frame members of the dolly into supportive engagement with the rear portions of the appliance after it has been partially withdrawn from the cabinet on the wheeled front support structure.

Referring now to FIGS. 1 and 2, there is shown an appliance dolly 1 incorporating features of the present invention. The appliance dolly 1 includes a pair of relatively low profile tandem truck wheel assemblies 2 and 3 rigidly interconnected by means of a horizontally directed foot bar or strut 4, as of 1 inch square steel tubing. The tubing 4 is rigidly connected as by welding to the tandem wheel assemblies 2 and 3 in between each of the tandem wheels of the assemblies 2 and 3 such that the strut 4 is stably supported from the tandem wheel assemblies 2 and 3. In a typical example, strut 4 has an axial length of approximately 34 inches such that the wheel assemblies 2 and 3 are spaced apart by a width which is wider than the width of the conventional domestic appliance 5 which is to be dollied. A pair of generally rectangular vertical side frame structures 6 and 7 are pivotably connected to tandem wheel assemblies 2 and 3, respectively. More particularly, each of the vertical frame structures 6 and 7 comprises forward and rear vertical leg portions 8 and 9, respectively, interconnected by a pair of horizontal lower and upper strut portions 11 and 12. In a typical example, the frames 6 and 7 are made of one inch electrical weld tubing. The horizontal strut portions 11 and 12 each have an axial extent of approximately 16 inches and the vertical leg prtions 8 and 9 each have a vertical extent of approximately 36 inches.

The forward corner 13 of each of the vertical frame structures 6 and 7 is pivotably secured to the tandem wheel assemblies 2 and 3 by means of a conventional top half of a pivotable caster assembly. More particularly the vertical stem of a pivotable caster assembly passes coaxially into each of the front vertical hollow legs 8. The caster stem is pinned to the horizontal strut 11 by means of a machine screw threaded into a spring nut captured within the horizontal strut 11. A ball bearing race assembly 14 pivotably interconnects the stem of the caster with the tandem wheel assemblies 2 and 3. Caster wheel assemblies 15 are also pivotably connected at the rear corners 16 of each of the side frame structures 6 and 7.

A vertically adjustable front lifting bar or strut 17 is slidably connected with each of the front vertical legs 8 via sleeve portions 18 fixedly secured to the ends of the lifting bar 17, as by welding. Sleeves 18 permit a vertically slidable and pivotable coupling between the forward lifting bar 17 and the vertical legs 8 of the pivotable side frames 6 and 7. A pair of vertically adjustable manually operable closeable clamping collars 19 are carried on the vertical legs 8 below the sleeves 18.

A pair of pivotable vertically adjustable lugs 21 are slidably carried on each of the rear vertical legs 9 of the side frames 6 and 7. Each of the lugs 21 includes a clamping collar portion 22 with a manually operable knob 23 for controlling the clamping action of the clamps 22.

In operation, a serviceman or installer pulls the appliance out of the enclosing cabinetry by a few inches as shown in FIG. 1. With the front lifting bar 17 in a lowered position the dolly 1 is pushed up to the cabinetry to position the horizontal front lifting bar 17 under the front lip portion of the applicance 5. The front lifting bar is then manually raised into supportive engagement with the front lip of the appliance 5. While the operator pulls up on the lifting bar 17 with one hand to take some of the weight of the appliance on the bar 17 he successively raises the clamping collars 19 into engagement with the bottom surfaces of the respective sleeves 18 and tightens the respective clamps 19 at opposite ends of the front lifting bar 17.

With the weight of the front region of the appliance 5 taken on the front lifting bar 17 the operator pulls on the rear vertical legs of the side frames 6 and 7 to dolly the appliance 5 further out of the cabinet as by, for example, 18 inches to 20 inches, as shown in FIG. 2. The side frames 6 and 7 are then rotated rearwardly of the appliance 5 to bring the lugs 21 under the rear portion of the appliance 5. The lugs 21 are then raised into supportive engagement with the rearwardly extending portions of the appliance 5 and are tightened via clamping knobs 23. The appliance 5 is now fully supported upon the dolly and may be pulled completely clear of the enclosing cabinetry for service or replacement. The appliance, as supported on the dolly, may then be lashed to a conventional hand truck to facilitate moving of the appliance to or from a vehicle.

Figure 3:
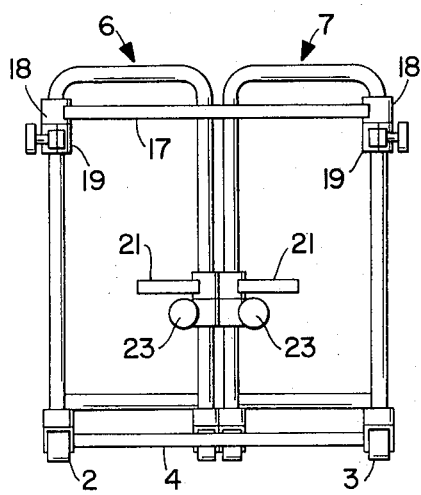
FIG. 3 is a view of the appliance dolly as folded for carrying.

Referring now to FIG. 3 there is shown the dolly of FIGS. 1 and 2 with the side frames 6 and 7 folded back toward the center of the foot bar 4 and horizontal lifting bar 17 for storage and carrying. When the dolly 1 is collapsed for carrying, the pivotable lugs 21 are preferably pivoted into the plane of the side frames 6 and 7 as shown in FIG. 3 to reduce the overall thickness of the collapsed dolly.

What is claimed is:

1. In an appliance dolly for dollying an appliance into and out of a cabinet enclosure:
   wheeled front support means having a vertically adjustable support structure for supportive engagement with a front region of an appliance to be dollied;
   a pair of wheeled rear support means pivotably interconnected with said front support means, each of said rear support means being rearwardly pivotable relative to said front support means and towards the opposite sides of the appliance being dollied, said rear support means having vertically adjustable support structure for supportive engagement with the appliance being dollied in a region rearwardly of said region of front supportive engagement as the appliance is withdrawn from its enclosure on said wheel front support means.

2. The apparatus of claim 1 wherein each of said pivotable sheeled rear support means includes a vertical structure having a front and rear vertical legs, and wherein said vertically adjustable support structure of said front support means includes a horizontal vertically adjustable strut interconnecting and being pivotably supported from a corresponding front vertical leg in each of said pair of pivotable vertical structures, said horizontal strut being adapted to supportively engage the lower front region of the appliance being dollied.

3. The apparatus of claim 2 wherein said wheeled front support means includes, a pair of tandem wheel assemblies for supportive engagement with the floor, and a second horizontal strut rigidly interconnecting said pair of tandem wheel assemblies.

4. The apparatus of claim 3 wherein said second horizontal strut is connected to each of said tandem wheel assemblies between tandem wheels thereof, and wherein the front vertical legs of each of said pivotable structures of said rear support means are pivotable about a vertical axis intersecting each of said tandem wheel assemblies between tandem wheels thereof.

5. The apparatus of claim 2 wherein said vertically adjustable support structure of said rear support means includes, vertically adjustble lug means carried on each of said rear vertical legs of said pivotable structures of said rear support means for supportive engagement with a rearwardly extending portion of the appliance when said pivotable structures are pivoted into supportive engagement with the appliance after the appliance has been pulled outwardly of an enclosure on said wheeled front support means.

6. The apparatus of claim 5 wherein said lugs are pivotable relative to their respective rear vertical legs to facilitate flat collapsibility of the dolly for storage and carrying.

7. In an appliance dolly for dollying an appliance into and out of a cabinet enclosure:
   Wheeled front support means having a support structure for supportive engagement with a front region of an appliance to be dollied;
   a pair of wheeled rear support means pivotably interconnected with said front support means, each rear support means being rearwardly pivotable relative to said front support means and toward the opposite sides of the appliance being dollied, said rear support means including a rear support structure for supportive engagement with the appliance being dollied in a region rearwardly of said region of front supportive engagement as the appliance is withdrawn from its enclosure on said wheeled front support means; and
   each of said pivotable wheeled rear support means including a vertical structure including a rear vertical leg for supporting said rear support structure.

* * * * *

PO-1050
(5/69)

UNITED STATES PATENT OFFICE
CERTIFICATE OF CORRECTION

Patent No. 3,807,750  Dated April 30, 1974

Inventor(s) WARREN F. BROWN

It is certified that error appears in the above-identified patent and that said Letters Patent are hereby corrected as shown below:

Claim 2, line 2; replace "sheeled" with --wheeled--.

Signed and sealed this 3rd day of December 1974.

(SEAL)
Attest:

McCOY M. GIBSON JR.
Attesting Officer

C. MARSHALL DANN
Commissioner of Patents